DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 818

T900,007
ACID MODIFIED POLYESTER FIBERS DYED WITH BASIC DYESTUFFS

Richard D. Neal, 504-D Manor Drive, Kingsport, Tenn. 37660

Filed May 12, 1971, Ser. No. 142,817
Int. Cl. D06p *5/00*
U.S. Cl. 8—168
No Drawing. 16 Pages Specification

Disclosed are polyester textile fibers having dispersed therein a specific type of precipitated barium sulfate, the barium sulfate having an average particle size of about 0.8 micron. The fibers disclosed are characterized by improved dyeability with disperse dyes and soil-hiding properties. Also disclosed are yarns and fabrics containing the novel fibers of this invention in blends or as plied yarns. The particular polyester fibers utilized in the blends and plied yarns are: poly(1,4-cyclohexylene dimethylene terephthalate) containing 5% poly(oxyethylene glycol) of about 1500 molecular weight; poly(1,4-cyclohexylene dimethylene terephthalate) containing 5% poly(oxyethylene glycol) of about 1500 molecular weight and about 2.8% precipitated barium sulfate; poly(1,4-cyclohexylene dimethylene terephthalate); poly(1,4-cyclohexylene dimethylene terephthalate) containing precipitated barium sulfate; poly(ethylene terephthalate) modified with 5(4-sodiosulfophenoxy)isophthalic acid incorporated in the polymer chain in an amount sufficient to impart basic dyeability thereto; poly(ethylene terephthalate) modified with 5(4-sodiosulfophenoxy) isophthalic acid incorporated in the polymer chain in an amount sufficient to impart basic dyeability thereto and containing precipitated barium sulfate; poly(ethylene terephthalate) heat set at 180° C.; and poly(ethylene terephthalate) heat set at 180° C. and containing precipitated barium sulfate. The novel yarns and fabrics disclosed in this specification are characterized by novel color effects which can be obtained in a single dye bath. Likewise, soil-hiding and apparent cleanability properties of the fabrics are enhanced as well as the desirable color combination obtained.